(12) United States Patent
Cavaliere et al.

(10) Patent No.: US 8,971,704 B2
(45) Date of Patent: Mar. 3, 2015

(54) OPTICAL NETWORKS

(75) Inventors: Fabio Cavaliere, Vecchiano (IT); Luca Giorgi, Ponsasso (IT); Renato Grosso, Genoa (IT); Ernesto Ciaramella, Rome (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 319 days.

(21) Appl. No.: 13/512,724

(22) PCT Filed: Dec. 3, 2009

(86) PCT No.: PCT/EP2009/066310
§ 371 (c)(1),
(2), (4) Date: Oct. 10, 2012

(87) PCT Pub. No.: WO2011/066858
PCT Pub. Date: Jun. 9, 2011

(65) Prior Publication Data
US 2013/0028598 A1    Jan. 31, 2013

(51) Int. Cl.
*H04B 10/08*    (2006.01)
*H04B 17/00*    (2006.01)
*H04B 10/00*    (2013.01)
(Continued)

(52) U.S. Cl.
CPC .......... *H04J 14/0227* (2013.01); *H04B 10/071* (2013.01); *H04J 14/0226* (2013.01); *H04J 14/0282* (2013.01); *H04J 14/0246* (2013.01);
(Continued)

(58) Field of Classification Search
CPC ................... H04B 10/07955; H04B 10/00398; H04B 10/07953; H04B 10/77; H04J 14/0222; H04J 14/00; H04J 14/0227

USPC ............................................ 398/34, 25, 21, 9
See application file for complete search history.

(56) References Cited

U.S. PATENT DOCUMENTS 5,005,166 A * 4/1991 Suzuki et al. .................... 398/47
5,179,420 A * 1/1993 So et al. ........................ 356/73.1
(Continued)

FOREIGN PATENT DOCUMENTS

EP    1892870    2/2008
EP    1978653    10/2008

OTHER PUBLICATIONS

International Search Report for PCT/EP2009/066310 mailed Jun. 2, 2010.
(Continued)

*Primary Examiner* — Oommen Jacob
(74) *Attorney, Agent, or Firm* — Baker Botts, LLP

(57) ABSTRACT

An optical network (1) comprising an optical network element (10) comprising a first optical transmitter (14), a first controller (16), a first optical receiver and a second optical receiver and a second optical network element (12). There is provided a transmission path (30) between said first optical network element and said second optical network element. Said first optical transmitter is arranged to generate and transmit a first optical signal. Said first controller is arranged to control said first optical transmitter to generate and transmit said first optical signal at a wavelength selected from a predetermined plurality of wavelengths. Said first optical receiver is arranged to detect a backscatter portion of said first optical signal returned to said first optical network element along said transmission path by distributing scattering.

16 Claims, 7 Drawing Sheets

(51) Int. Cl.
*G01M 11/00* (2006.01)
*H04J 14/02* (2006.01)
*H04B 10/071* (2013.01)

(52) U.S. Cl.
CPC ........... *H04J 14/025* (2013.01); *H04J 14/0257* (2013.01); *H04J 14/0265* (2013.01)
USPC ......... 398/34; 398/25; 398/21; 398/9; 398/31

(56) References Cited

U.S. PATENT DOCUMENTS

| | | | |
|---|---|---|---|
| 5,285,305 A * | 2/1994 | Cohen et al. | 398/31 |
| 5,963,313 A * | 10/1999 | Anderson | 356/73.1 |
| 5,995,687 A * | 11/1999 | White | 385/14 |
| 6,067,150 A * | 5/2000 | Beller et al. | 356/73.1 |
| 6,542,228 B1 * | 4/2003 | Hartog | 356/73.1 |
| 6,819,412 B2 * | 11/2004 | Glingener et al. | 356/73.1 |
| 8,077,298 B2 * | 12/2011 | Wang et al. | 356/73.1 |
| 8,411,259 B2 * | 4/2013 | Levin et al. | 356/73.1 |
| 8,565,618 B2 * | 10/2013 | Xia et al. | 398/196 |
| 2003/0231888 A1 * | 12/2003 | Takashina et al. | 398/149 |
| 2004/0160664 A1 * | 8/2004 | Sobe et al. | 359/334 |
| 2004/0179855 A1 | 9/2004 | Harada | |
| 2007/0252998 A1 * | 11/2007 | Berthold et al. | 356/450 |
| 2008/0050115 A1 | 2/2008 | Ikai et al. | |
| 2008/0100828 A1 * | 5/2008 | Cyr et al. | 356/73.1 |
| 2009/0016726 A1 | 1/2009 | Suzuki et al. | |
| 2009/0052828 A1 * | 2/2009 | Uemura et al. | 385/10 |
| 2010/0014071 A1 * | 1/2010 | Hartog | 356/73.1 |
| 2011/0141457 A1 * | 6/2011 | Levin et al. | 356/73.1 |
| 2013/0028598 A1 * | 1/2013 | Cavaliere et al. | 398/34 |
| 2013/0148957 A1 * | 6/2013 | Snawerdt | 398/13 |

OTHER PUBLICATIONS

K. Enbutsu et al., "Individual Fiber Line Testing Technique for PON Using Wavelength Assigned FBG Termination and TLS-OTDR Enhances with Reflected Trace Analysis Method", 2008 Joint Conference of the Opto-Electronics and Communications Conference (OECC) and the Australian Conference on Optical Fibre Technology (ACOFT), Jul. 7, 2008, pp. 1-2.

H. Suzuki et al., "Demonstration of Plug-and-Play Function by Automatically Controlling Tunable DWDM-SFP Transceiver for Coexistence-Type Colorless WDM-PON's", 2008 Optical Fiber Communication Conference/National Fiber Optic Engineers Conference IEEE, pp. 2507-2509.

* cited by examiner

OPTICAL NETWORKS

This application is the U.S. national phase of International Application No. PCT/EP2009/066310 filed 3 Dec. 2009 which designated the U.S., the entire contents is hereby incorporated by reference.

FIELD OF THE INVENTION

The invention relates to an optical network, an optical network element, a method of configuring a wavelength of an optical transmitter in an optical network and a method of remotely setting a wavelength of an optical transmitter in an optical network.

BACKGROUND OF THE INVENTION

Optical network technology is moving towards providing fibre to multiple access points or hubs such as homes and offices utilizing wavelength division multiplexing (WDM). This type of optical network can provide a versatile structure supporting a number of optical network elements. One particular solution for this fibre access (FTTX) or fibre to the home (FTTH) is wavelength division multiplexed passive optical networks (WDM-PON) in which a separate wavelength channel is used to communicate from the central office (CO) optical line terminal (OLT) to the optical network unit (ONU) at each access point. This approach creates a virtual point-to-point link between the CO and each ONU, in contrast to the point to multipoint topology of a regular PON. The WDM-PON network architecture requires that each ONU transmits upstream on a different wavelength. Providing each ONU with a different fixed wavelength transmitter is a costly approach and has maintenance problems associated with it. An alternative, more attractive, approach is to provide tunable lasers as the transmitters in each ONU. However, using tunable lasers at the ONUs faces the problem of tuning each laser to the correct wavelength for its associated channel.

SUMMARY OF THE INVENTION

It is an object to provide an improved optical network. It is a further object to provide an improved optical network element, such as an improved ONU. It is a further object to provide an improved method of configuring a wavelength of an optical transmitter in an optical network. It is a further object to provide an improved method of remotely setting a wavelength of an optical transmitter in an optical network.

A first aspect of the invention provides an optical network comprising a first optical network element, a second optical network element and a transmission path between said first optical network element and said second optical network element. A first optical network element comprises a first optical transmitter, a first controller, a first optical receiver and a second optical receiver. Said first optical transmitter is arranged to generate and transmit a first optical signal. Said first controller is arranged to control said first optical transmitter to generate and transmit said first optical signal at a wavelength selected from a predetermined plurality of wavelengths. Said first optical receiver is arranged to detect a backscatter portion of said first optical signal returned to said first optical network element along said transmission path by scattering. Said second optical receiver is arranged to detect a second optical signal. Said second optical network element comprises a second optical transmitter, a second controller and a third optical receiver. Said second optical transmitter is arranged to generate and transmit said second optical signal. Said second controller is arranged to control said second optical transmitter to generate and transmit said second optical signal. Said third optical receiver is arranged to detect an optical signal having a wavelength within a receiving wavelength band. Said first optical receiver is arranged to detect a predetermined criterion of said returned backscatter portion of said first optical signal at said selected wavelength and to detect a characteristic of said predetermined criterion. Said characteristic being indicative of the backscatter optical power of said returned backscatter portion of said first optical signal at said selected wavelength. Said first optical receiver is arranged to compare said characteristic with a threshold value. Said first controller is arranged to iteratively generate and transmit said first optical signal at different wavelengths of said plurality of wavelengths. Said first controller is arranged to identify a said wavelength for which said characteristic is above said threshold value. Said first controller is further arranged to control said first optical transmitter to subsequently maintain generation and transmission of said first optical signal at said wavelength at which said characteristic is above said threshold value. Said third optical receiver is arranged to detect said first optical signal having said wavelength within a receiving band.

The detected return portion of said first optical signal can be that portion returned by back reflection or backscatter or as distributed scattering along said transmission path. Said first controller can be arranged to control said first optical transmitter to generate and transmit said first optical signal following detection of backscatter optical power of said first optical signal following comparison with a threshold value. The wavelength at which first said optical signal is generated and transmitted can be thus set to the transmission wavelength of the transmission path and said second optical element and a pass band of the connection to the second optical element. The optical network can be thus arranged to configure the wavelength of an optical transmitter at an optical network element based simply on detection of backscatter or back reflection returned signal from the transmission path. The configuration of the wavelength of an optical transmitter can be thus controlled at the physical layer of the network, independent of the transmission protocol, standard and bit rate used by the networks.

In such a network, no handshake is required between the first optical network element and the second optical network element. Said second optical transmitter could simply generate and transmit a second optical signal following detection of the pass band of the transmission line by the first optical receiver.

The configuration of the wavelength of an optical transmitter can be thus controlled independently of the rest of the network. It is not necessary even that the second optical network element is present, merely that a detection event is above a threshold value.

In an embodiment, said first controller comprises a memory. Said first controller is arranged to iteratively store in said memory said characteristic indicative of the backscatter optical power at each one of said different wavelengths. Said first controller is arranged to identify a said wavelength for which said characteristic is the maximum stored value in said memory.

Utilising a memory to iteratively store said characteristic indicative of the optical backscatter power thus enables the said characteristic to be stored for each one of said different wavelengths and thus said first controller can identify a said wavelength corresponding to the backscatter optical power and thus detect the wavelength at which to transmit.

In an embodiment said characteristic is the measured optical signal power of said returned backscatter portion. Measurement devices and detectors as commonly known in the art are suitable for accurate optical power measurement, thus the network can be configured without specialist measurement equipment or significant additional hardware.

In an embodiment, said transmission path comprises a wavelength selective router having a first port coupled to an output of said first optical network element. Said wavelength selective router is provided with a pass wavelength band aligned with a transmission wavelength band. Said wavelength selective router is arranged such that said backscatter optical power is returned to said first optical receiver when a wavelength of said first transmitter is tuned to said pass band. In an embodiment said wavelength selective router comprises a plurality of second ports, each connected to a said first port. Each one of said plurality of second ports is provided with a separate pass wavelength band. In an embodiment, said wavelength selective router comprises a wavelength division multiplexer/demultiplexer having a wavelength band covering a spectral range which includes the wavelength of only one channel on a wavelength division multiplexed channel grid, and thus only one channel within said optical network. The optical network is thus arranged to configure the wavelength of the first optical transmitter to the wavelength channel of the pass wavelength band of a said port. In an embodiment, said wavelength division multiplexer/demultiplexer comprises an arrayed waveguide grating. A said output port is arranged to transmit an optical signal having a wavelength within said receiving wavelength band. Optical signals having a wavelength outside said receiving wavelength band are substantially attenuated.

In an embodiment, said first optical transmitter comprises a wavelength tuneable optical source, such as a wavelength tuneable laser. In an alternative embodiment, said first optical transmitter comprises a plurality of fixed wavelength optical sources. In an embodiment, said optical receiver comprises a wide band optical receiver.

A second aspect of the invention provides an optical network comprising a first optical network element connected a transmission path. Said transmission path is arranged to carry a first optical signal. Said first optical network element comprises a first optical transmitter, a first controller, a first optical receiver and a second optical receiver. Said first optical transmitter is arranged to generate and transmit a first optical signal. Said first controller is arranged to control said first optical transmitter to generate and transmit said first optical signal at a wavelength selected from a predetermined plurality of wavelengths. Said first optical receiver is arranged to detect a backscatter portion of said first optical signal returned to said first optical network element along said transmission path by distributed scattering. Said second optical receiver is arranged to detect a second optical signal. Said first optical receiver is arranged to detect a predetermined criterion of said returned backscatter portion of said first optical signal at said selected wavelength and to detect a characteristic of said predetermined criterion. Said characteristic being indicative of backscatter optical power of said returned backscatter portion of said first optical signal at said first selected wavelength. Said first optical receiver is arranged to compare said characteristic with a threshold value. Said first controller is arranged to iteratively generate and transmit said first optical signal at different wavelengths of a said plurality of wavelengths. Said first controller is arranged to identify a said wavelength for which said characteristic is above said threshold value. Said first controller is further arranged to control said first optical transmitter to subsequently maintain generation and transmission of said first optical signal at said wavelength at which said characteristic is above said threshold value.

The detected return portion of said first optical signal can be that portion returned by back reflection or backscatter or as distributed scattering along said transmission path. Said first controller can be arranged to control said first optical transmitter to generate and transmit said first optical signal following detection of backscatter optical power of said first optical signal following comparison with a threshold value. The wavelength at which first said optical signal is generated and transmitted can be thus set to the transmission wavelength of the transmission path and said second optical element and a pass band of the connection to the second optical element. The optical network can be thus arranged to configure the wavelength of an optical transmitter at an optical network element based simply on detection of backscatter or back reflection returned signal from the transmission path. The configuration of the wavelength of an optical transmitter can be thus controlled at the physical layer of the network, independent of the transmission protocol, standard and bit rate used by the networks.

In such a network, no handshake is required between the first optical network element and the second optical network element. Said second optical transmitter could simply generate and transmit a second optical signal following detection of the pass band of the transmission line by the first optical receiver.

The configuration of the wavelength of an optical transmitter can be thus controlled independently of the rest of the network. It is not necessary even that the second optical network element is present, merely that a detection event is above a threshold value.

In an embodiment, said transmission path comprises a wavelength selective router having a first port coupled to an output of said first optical network element. Said wavelength selective router is provided with a pass wavelength band aligned with a transmission wavelength band. Said wavelength selective router is arranged such that said backscatter optical power is returned to said first optical receiver when a wavelength of said first transmitter is tuned to said pass band. In an embodiment said wavelength selective router comprises a plurality of second ports, each connected to a said first port. Each one of said plurality of second ports is provided with a separate pass wavelength band. In an embodiment, said wavelength selective router comprises a wavelength division multiplexer/demultiplexer having a wavelength band covering a spectral range which includes the wavelength of only one channel on a wavelength division multiplexed channel grid, and thus only one channel within said optical network. The optical network is thus arranged to configure the wavelength of the first optical transmitter to the wavelength channel of the pass wavelength band of a said port. In an embodiment, said wavelength division multiplexer/demultiplexer comprises an arrayed waveguide grating. A said output port is arranged to transmit an optical signal having a wavelength within said receiving wavelength band. Optical signals having a wavelength outside said receiving wavelength band are substantially attenuated.

In an embodiment said first optical signal comprises a predetermined signal sequence. Said characteristic of said predetermined criterion of said backscatter portion is the average optical power over said predetermined signal sequence. In an embodiment said signal sequence of said first optical signal comprises a predetermined sequence of pulses transmitted as an optical signal e.g. comprising optical 'bits' representative of "1s" and "0s". In an embodiment, said predetermined criterion of said backscatter portion is the average optical power over said pulsed sequence.

In an embodiment said first controller comprises a digital signal processor. Said digital signal processor is arranged to store and analyse said characteristic indicative of backscatter optical power. Thus the first optical network element is provided with digital signal processing capability such that the quality of the transmission path and transmission link in said optical network can be monitored. Monitoring features can include attenuation profile assessment and detection of the presence of lumped reflection points.

In an embodiment connection between one or more components in said transmission path of said optical network includes an insertion loss such that a reflectance value from said component and said connection is in the range from 45 dB to 60 dB.

In an embodiment said connection comprises a coupling formed by an angle polished connector. The returned backscatter portion of said first optical signal is thus comprised in the main part of optical power generated in the transmission path and beyond a remote node port of said network. Thus the wavelength at which said backscatter portion of said first optical signal is a maximum corresponds to a correct wavelength for transmission of said first optical signal, due to backscatter optical power Rayleigh backscattering into said transmission path by distributed scattering.

In an embodiment, said optical network comprises a plurality of said first optical network elements, a corresponding plurality of first optical transmitters, a corresponding plurality of first optical receivers and a corresponding plurality of second optical receivers. Said wavelength selective router has a plurality of output ports and said optical receivers are each coupled to a respective said port. Each said output port is arranged to transmit an optical signal having a wavelength within a different receiving wavelength band. Each said optical receiver is thus arranged to detect an optical signal having a wavelength within a different channel of the network.

In an embodiment, said plurality of said first optical network elements are connected to said wavelength selective router via a second wavelength selective router, each said first optical element being connected to a different one of a plurality of input ports. In an embodiment, said second wavelength selective router comprises a wavelength division multiplexer/demultiplexer, each said first optical network element being connected to a different one of a plurality of input/output ports of said wavelength division multiplexer/demultiplexer. In an embodiment, said wavelength division multiplexer comprises an arrayed waveguide grating. The optical network is thus arranged to configure the wavelength of each of said first optical transmitter according to the respective said input/output port of said wavelength division multiplexer/demultiplexer to which said first optical transmitter is coupled, and thus according to the channel of the network to which said first optical transmitter is allocated.

In an embodiment said transmission path comprises a transmission medium. In an embodiment said transmission path comprises an optical fibre element. In an embodiment, said optical network further comprises an optical link provided between the or each said optical network element and said wavelength selective router, and the or each said optical network element is located remotely from the or each said optical receiver. In an embodiment, said wavelength division multiplexer/demultiplexer is located remotely from said wavelength selective router.

A third aspect of the invention provides an optical network element comprising an optical transmitter, a controller, a first optical receiver and a second optical receiver. Said optical transmitter is arranged to generate and transmit a first optical signal. Said controller is arranged to control said optical transmitter to generate and transmit said first optical signal at a wavelength selected from a predetermined plurality of wavelength. Said first optical receiver is arranged to detect a backscatter portion of said first optical signal returned to said optical network element by distributing scattering. Said second optical receiver is arranged to detect a second optical signal. Said first optical receiver is arranged to detect a predetermined criterion of said returned backscatter portion of said first optical signal at said selected wavelength and to detect a characteristic of said predetermined criterion. Said characteristic being indicative of the backscatter optical power of returned backscatter portion of said first optical signal at said selected wavelength. Said first optical receiver is arranged to compare said characteristic with a threshold value. Said controller is arranged to iteratively generate and transmit said first optical signal at different wavelengths of said plurality of wavelengths. Said controller is arranged to identify a said wavelength for which said characteristic is above said threshold value. Said controller is further arranged to control said optical transmitter to subsequently maintain generation and transmission of said first optical signal at said wavelength at which said characteristic is above said threshold value.

The detected return portion of said first optical signal can be that portion returned by back reflection or backscatter or as distributed scattering along said transmission path. Said first controller can be arranged to control said first optical transmitter to generate and transmit said first optical signal following detection of backscatter optical power of said first optical signal following comparison with a threshold value. The wavelength at which first said optical signal is generated and transmitted can be thus set to the transmission wavelength of the transmission path and said second optical element and a pass band of the connection to the second optical element. The optical network can be thus arranged to configure the wavelength of an optical transmitter at an optical network element based simply on detection of backscatter or back reflection returned signal from the transmission path. The configuration of the wavelength of an optical transmitter can be thus controlled at the physical layer of the network, independent of the transmission protocol, standard and bit rate used by the networks.

In such a network, no handshake is required between the first optical network element and the second optical network element. Said second optical transmitter could simply generate and transmit a second optical signal following detection of the pass band of the transmission line by the first optical receiver.

The configuration of the wavelength of an optical transmitter can be thus controlled independently of the rest of the network. It may not be necessary even that the second optical network element is present, merely that a detection event is above a threshold value.

In an embodiment, said transmission path comprises a wavelength selective router having a first port coupled to an output of said first optical network element. Said wavelength selective router is provided with a pass wavelength band aligned with a transmission wavelength band. Said wavelength selective router is arranged such that said backscatter optical power is returned to said first optical receiver when a wavelength of said first transmitter is tuned to said pass band. In an embodiment said wavelength selective router comprises a plurality of second ports, each connected to a said first port. Each one of said plurality second ports is provided with a separate pass wavelength band. In an embodiment, said wavelength selective router comprises a wavelength division multiplexer/demultiplexer having a wavelength band covering a spectral range which includes the wavelength of only one channel on a wavelength division multiplexed channel grid, and thus only one channel within said optical network. The optical network is thus arranged to configure the wavelength of the first optical transmitter to the wavelength channel of the pass wavelength band of a said port. In an embodiment, said wavelength division multiplexer/demultiplexer comprises an arrayed waveguide grating. A said output port is arranged to transmit an optical signal having a wavelength within said receiving wavelength band. Optical signals having a wavelength outside said receiving wavelength band are substantially attenuated.

A fourth aspect of the invention provides a method of configuring an optical transmitter in an optical network. The method comprises, generating and transmitting a first optical signal at a wavelength selected from a predetermined plurality of wavelengths. Said method comprises receiving a returned backscatter portion of said first optical signal at an optical receiver arranged to detect an optical signal having a wavelength within a receiving wavelength band. A step of detecting a predetermined criterion of said returned backscatter portion of said first optical signal at said first detective wavelength and detecting a characteristic of said predetermined criterion. Said characteristic is indicative of a backscatter optical power of said returned backscatter portion, at a said optical receiver arranged to detect said characteristic. The method further comprises, at said optical receiver, comparing said characteristic with a threshold value. Said method comprises iteratively generating and transmitting said first optical signal at different wavelengths of said predetermined plurality of wavelengths. Said method comprises, identifying a said wavelength for which said characteristic is above said threshold value. When said characteristic is determined to be above said threshold value, said method comprises subsequently maintaining generation and transmission of said first optical signal at said wavelengths.

A fifth aspect of the invention provides a method of configuring a controller for an optical transmitter being an optical network. The method comprises issuing instructions directed to the steps of generating and transmitting a first optical signal at a wavelength selected from a predetermined plurality of wavelengths. Said method comprises the step of receiving a returned backscatter portion of said first optical signal at an optical receiver arranged to detect an optical signal having a wavelength within a receiving wavelength band. A step of detecting a predetermined criterion of said returned backscatter portion of said first optical signal at said first detective wavelength and detecting a characteristic of said predetermined criterion. Said characteristic is indicative of the backscatter optical power of said returned backscatter portion, at a said optical receiver arranged to detect said characteristic. The method further comprises, at said optical receiver, comparing said characteristic with a threshold value. Said method comprises iteratively generating and transmitting said first optical signal at different wavelengths of said predetermined plurality of wavelengths. Said method comprises issuing instructions directed to the step of identifying a said wavelength for which said characteristic is above said threshold value. When said characteristic is determined to be above said threshold value, said method comprises subsequently maintaining generation and transmission of said first optical signal at said wavelength.

The method may thereby configure the wavelengths of an optical transmitter based simply on detection of the backscatter returned to said first optical receiver. The configuration of the wavelength of an optical transmitter can be thus controlled just utilising the physical layout of the network in which the method is used, independent of the transmission protocol, standard and bit rate used by the network. In such a network, no handshake is required between the first optical network element and a second optical network element. The method can insure that the optical network element transmits and receives at the correct receiving wavelength band, thereby controlling and minimising errors. The method can thus enable the optical network element to receive and transmit correctly without requiring the provision of dedicated additional hardware.

A sixth aspect of the invention provides a data carrier having computer readable instructions embodied therein. These said computer readable instructions are for providing access for resources available of a processor. The computer readable instructions comprise instructions to cause the processor to perform any of the above steps of the method of configuring an optical transmitter in an optical network.

Embodiments of the invention will now be described in detail by way of example only, with reference to the accompanying drawings.

DESCRIPTION OF EMBODIMENTS OF THE INVENTION

Figure 1:
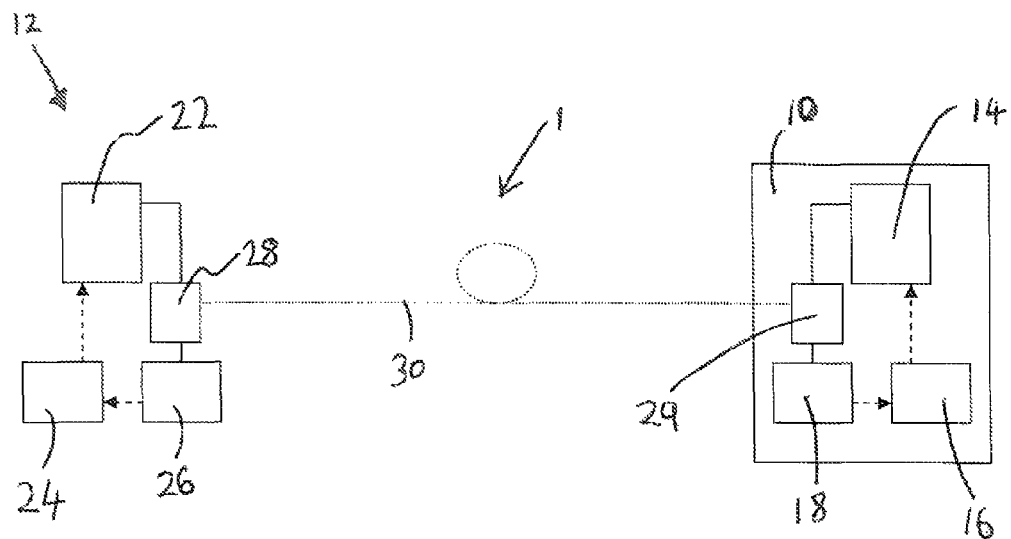
FIG. 1 is a schematic representation of an optical network according to a first embodiment of the invention.

Referring to FIG. 1, the first embodiment of the invention provides an optical network 1 comprising a first optical network element 10. The first optical network element 10 comprises a first optical transmitter 14, a first controller 16 and an optical receiver 18.

The first optical network element 10 will typically be connected to an optical link, in FIG. 1 an optical link comprising transmission path 30 is shown. The first optical network element 10 further comprises a band split filter 29 by which the transition path 30 is coupled to the first optical transmitter 14 and to the optical receiver 18.

The first optical transmitter 14 is arranged to generate and transmit a first optical signal. The first controller 16 is arranged to control the first optical transmitter 14 to generate and transmit the first optical signal at a wavelength selected from a predetermined plurality of wavelengths, being the wavelengths of channels of the optical network 1. The optical receiver 18 is arranged to detect a second optical signal.

The optical network 1 further comprises a second optical network element 12. The second optical network element 12 comprises a second optical transmitter 22, a second controller 24 and optical receiver apparatus 26. A second band split filter 28 is provided to couple the transmission path 30 to the second optical transmitter 22 and the optical receiver apparatus 26.

Band split filter 28 and band split filter 29 are provided to couple the transmission path 30 between the first optical network element 10 and the second optical network element 12.

The second optical transmitter 22 is arranged to generate and transmit a second optical signal. The second controller 24 is arranged to control the second optical transmitter to generate and transmit the second optical signal. The optical receiver apparatus 26 is arranged to detect an optical signal having a wavelength within a receiving wavelength band. The receiving wavelength band covers a predetermined range of wavelengths and typically will include the wavelengths of only one channel of the optical network 1. The second controller 26 is arranged to control the second optical transmitter 22 to generate and transmit a second optical signal.

Figure 2:
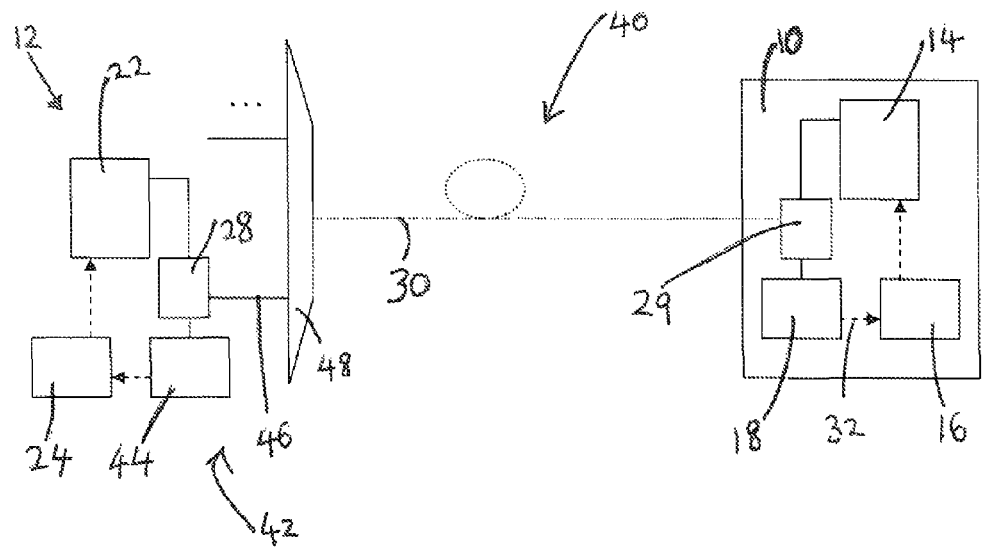
FIG. 2 is a schematic representation of an optical network according to a second embodiment of the invention.

A second embodiment of the invention, shown in FIG. 2, provides an optical network 40 which is substantially the same as the optical network 1 of the previous embodiment, with the following modifications. The same reference numbers are retained for corresponding features.

In this embodiment, the optical receiver apparatus 42 comprises an optical detector 44 coupled to an output port 46 of a wavelength selective router 48. The output port 46 is coupled to the optical detector 44 via the band split filter 28. The wavelength selective router 48 is coupled, on its input side, to the transmission path 30. As before, the transmission path 30 provides connection between the first optical network element 10 and the second optical network element 12.

The first optical transmitter 1 comprises a wavelength tuneable laser and the second optical transmitter 22 comprises a fixed wavelength laser. Each of the optical receiver 18 and the optical detector 44 comprise wide band detectors, such as photo detectors.

In this example, the wavelength selective router 48 comprises an arrayed waveguide grating (AWG). As will be well known to the person skilled in the art, AWGs experience some cross-talk between various channels/ports caused by optical signals on one channel leaking into adjacent channels, and thus arriving at the wrong output port of the AWG. Although AWGs are able to almost cancel out of band wavelengths (wavelengths outside the receiving wavelength band of a particular channel), some cross-talk will nevertheless exist between channels of an AWG. The AWG can be chosen and designed to have a maximum adjacent cross-talk such that a signal received by cross-talk or a signal at the wrong wavelength for a channel will experience significant attenuation on transmission through the AWG, so that the maximum cross-talk power of an optical signal leaking from one channel to an adjacent channel will be a small fraction of its in channel power and thus will not be detected as a signal in the channel the signal has incorrectly arrived at. The output port 46 of the AWG 48 is arranged to transmit an optical signal having a wavelength within a receiving wavelength band of the optical detector 44. That is to say, the output port 46 is arranged to transmit wavelengths corresponding to a single channel of a WDM grid, being a single channel of the optical network 40.

Figure 3:
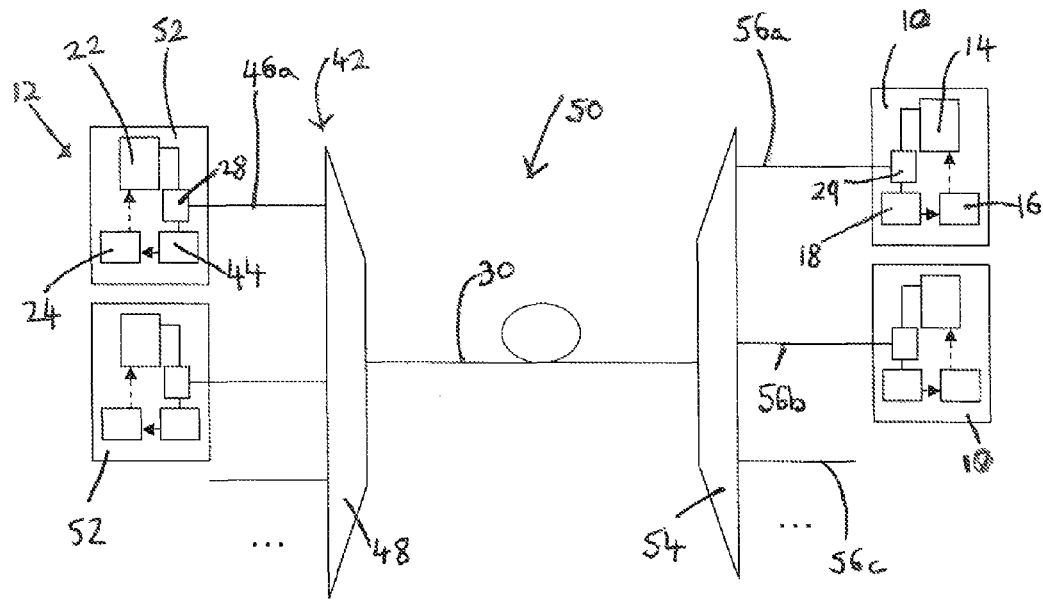
FIG. 3 is a schematic representation of an optical network according to a third embodiment of the invention.

Referring to FIG. 3, a third embodiment of the invention provides an optical network 50 which is substantially the same as the optical network 40 of the previous embodiment, with the following modifications. The same reference numbers are retained for corresponding features.

In this embodiment, the optical network 50 comprises a plurality of first optical network elements 10, each coupled to the transmission path 30 via a second wavelength selective router 54, which in this example comprises a second AWG. Each first optical network element 10 is connected to a respective output port 56 $a$, 56 $b$, 56 $c$ of the AWG 54.

The AWG 54 may be a cyclic AWG generating a first wavelength range used for downstream optical signals, i.e. the optical signals from the respective second optical transmitters 22, and a second wavelength range being used for upstream optical signals, namely the first optical signal. The two wavelength ranges are separated by the free spectral range (FSR) of the AWG 54. The AWG 48 may similarly be a cyclic AWG.

The optical network 50 further comprises a plurality of second optical network elements 52, each comprising a second optical transmitter 22, second controller 24, optical detector 44 and band split filter 28, as described above in FIG. 2. Each second optical network element 52 is coupled to a respective input port 46 $a$, 46 $b$, 46 $c$ of the AWG 48.

The optical detector 44 of each second optical network element 52 has a receiving wavelength band covering a different range of wavelengths, so that each optical detector 44 and thus each second optical network element 52, is arranged to detect first optical signals relating to a different channel of the optical network 50.

Figure 4:
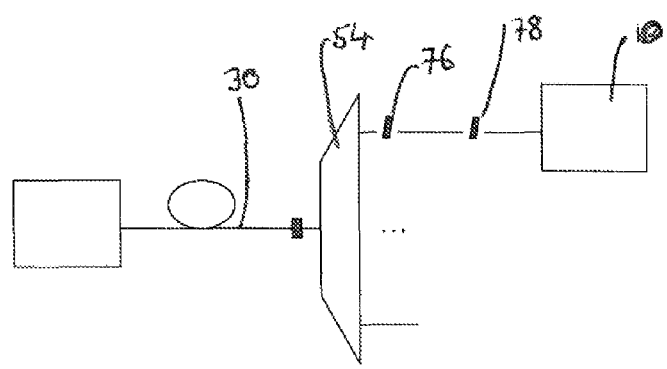
FIG. 4 is a is a schematic representation of an arrayed waveguide grating and optical link of FIG. 3.
Figure 5:
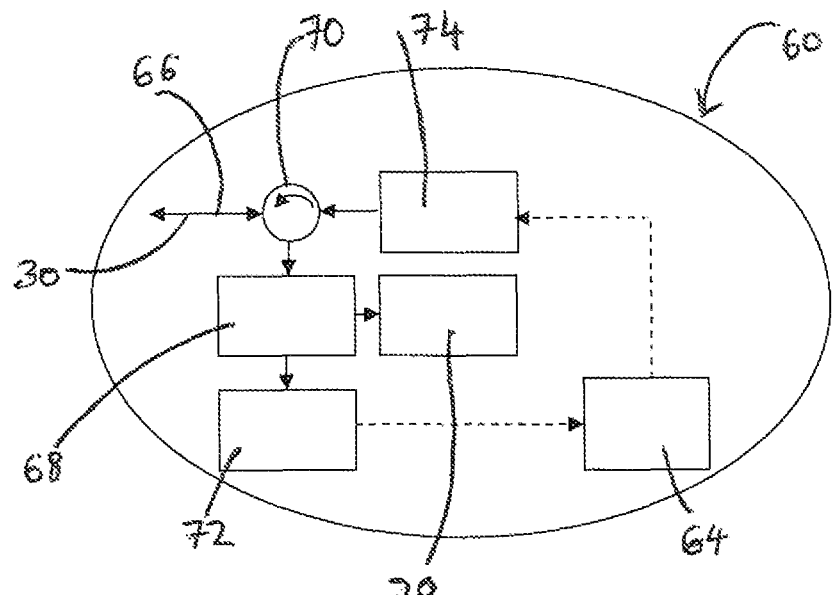
FIG. 5 is a schematic representation of an optical network element according to a fourth embodiment of the invention.

Referring to FIG. 4 and FIG. 5, the first optical network element 10 may comprise the following arrangements. FIG. 4 shows a simplified scheme of the third embodiment in block diagram form. The first optical network element 10 is coupled to the transmission path 30 via wavelength selective router 54, which in this example comprises an AWG. The coupling includes connections 76, 78 having a low insertion loss in the range from 50 dB to 60 dB, in this example the connections comprise angle polished connectors (APC). The APC components present a very low reflectance such that no significant optical power is reflected back to the first optical network element 10 from the connectors 76, 78 themselves. A component of a first optical signal transmitted as an upstream signal may be instead reflected and returned from the transmission path 30 itself by distributed scattering or Rayleigh scattering. Additionally there may be scattering and back reflection from a connection or coupling port beyond the coupling between the first optical network element and the AWG, i.e. a coupling or connector connecting the AWG 54 to the transmission path 30.

FIG. 5 represents details of the embodiment of the first optical network element 10 of FIG. 4. The details of the embodiment of FIG. 5 could equally be applied and used in embodiments illustrated in any one of FIGS. 1 to 4.

Referring to FIG. 5, in this embodiment the first network element 60 comprises a first optical transmitter 74, a first controller 64, a first optical receiver 72 and a second optical receiver 20. The first optical network element 60 further comprises a band split filter 68. Band split filter 68 is provided to couple the transmission path 30 to the second optical receiver apparatus 20 and the first optical receiver apparatus 72. The first optical transmitter 74 is arranged to generate and transmit a first optical signal. The first controller 64 is arranged to control the first optical transmitter 74 to generate and transmit the first optical signal 66 at a wavelength selected from a predetermined plurality of wavelengths, being the channel wavelengths of channels of the optical network. The first optical receiver 72 is arranged to detect a first optical signal, any portion of a first optical signal returned by backscatter or reflection and to detect a characteristic of said predetermined criterion said characteristic indicative of the backscatter optical power of said returned backscatter portion. The second optical receiver 20 is arranged to detect a second optical signal.

An optical circulator 70 is provided to couple the transmission path 30 between the first optical transmitter 74 and the band split filter 68. The optical circulator 70 is provided to separate an upstream optical signal from a backscatter portion of said first optical signal returned to the first optical network element 60 and from a downstream second optical signal.

The first controller 64 is arranged to control the first optical transmitter 74 to generate and transmit the first optical signal upstream along transmission path 30, in response to no optical signal being detected at first optical receiver 72 above a threshold value.

That is to say, the first controller 74 controls the first optical transmitter to generate and transmit the first optical signal when no optical signal is received by the first optical receiver 72. The first controller 64 is arranged to iteratively generate and transmit the first optical signal at different wavelengths of the plurality of wavelengths until an optical signal is detected at the first optical receiver 72. During a period where the optical signal is not detected at the optical receiver 72, the first controller 64 therefore controls the first optical transmitter 74 to generate and transmit a first optical signal at a first wavelength of the predetermined plurality of wavelengths. The first optical transmitter 74 continues to generate and transmit the first optical signal at the first selected wavelength for a time period long enough to allow the first optical signal to be transmitted across the optical transmission path 30 to the second optical network element 12, and for return, back scattered optical signal to be transmitted back across the transmission path 30 to the first optical network element 60 and the first optical receiver 72. If the wavelength of the first optical signal does not fall within the correct pass band of the port and transmission path connected to the second optical network element 12, there will not be significant backscatter generated along the transmission path 30. Thus the returned backscatter portion of the first optical signal will not be detected above the required threshold level by the first optical receiver 72.

If the first optical signal is not detected by the first optical receiver 72 and following the lapse of the required time period for upstream transmission of the first optical signal and subsequent return transmission of any resulting back scattered first optical signal, then the first controller 64 controls the first optical transmitter 74 to generate and transmit the first optical signal at a second wavelength of the predetermined plurality of wavelengths. The first controller 64 iteratively controls the first optical transmitter 74 to generate and transmit the first optical signal at different ones of the predetermined plurality of wavelengths until the returned backscatter portion of the optical signal is detected.

The first controller 64 is further arranged to subsequently maintain generation and transmission of the first optical signal at the wavelength at which the correct first optical signal and threshold value of backscatter is detected.

The optical network 50 is thus arranged to configure the wavelength of the first optical transmitter 74 by iteratively generating and transmitting at each of a predetermined plurality of wavelengths to see if they fall within the receiving wavelength band of the common port and transmission path of the remote optical network element connected to the transmission path 30. When the "correct" wavelength is reached for the first optical signal the second controller 24 can, in certain embodiments, control the second optical transmitter 22 to generate and transmit the second optical signal. Detection of the second optical signal by the first optical network element 60 is by the second optical receiver apparatus 20. The optical circulator 70 is used to route a downstream second optical signal to the second optical receiver 20 via the band split filter 68. In an embodiment the downstream signal is within the wavelength range C band (1530 to 1565 nm) and the upstream and backscatter portion of returned optical signal is within the L wavelength band (1565 to 1627 nm). In this way the downstream optical signal can be correctly received by the second optical receiver 20 and the back scattered optical signal can be sent to the receiver 72. In this example, the receiver 72 comprises a low pass filter and is arranged to average the detected optical power with a given time constant. In this example the average power is further sent to a digital signal processing block such that the averaged power value is stored and then used to adjust and correct the transmission wavelength of the first optical transmitter 74.

The configuration of the wavelength of the first optical transmitter can be based simply on the detection of a maximum backscatter of the returned first optical signal, which only occurs when the first optical signal is of the correct wavelength. The configuration of the wavelength of the first optical transmitter 74 can be thus controlled at the physical layer of the network 1, and is independent of the transmission protocol, standard and bit rate used by the network 1. In such a network, no handshake is required between the optical network element 10 and the components of the second optical network element 12. It is not necessary even that a second optical network element is present in the configuration of the wavelength.

Figure 6:
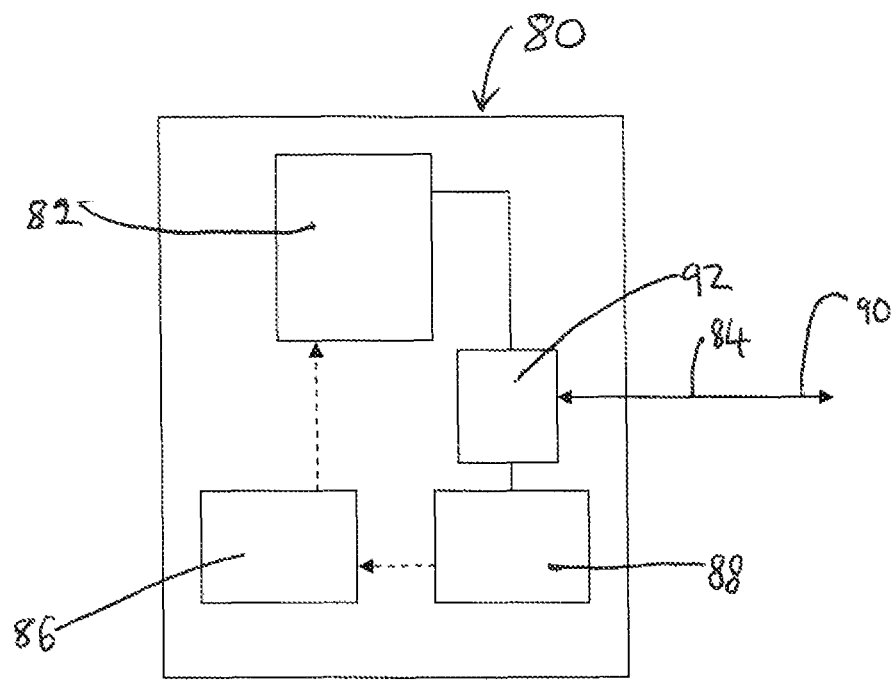
FIG. 6 is a schematic representation of an optical line terminal according to a fifth embodiment of the invention.

Referring to FIG. 6, a fourth embodiment of the invention provides an optical line terminal (OLT) 80 comprising an optical transmitter 82, a controller 86, optical receiver apparatus 88 and a band split filter 92.

The optical transmitter 82 is arranged to generate and transmit a first optical signal 84. The optical receiver apparatus 88 is arranged to detect a second optical signal having a wavelength within a receiving wavelength band. The controller 86 is arranged to control the optical transmitter to generate and transmit the first optical signal once the wavelength receiving band is set. The wavelength receiving band of the optical receiver apparatus 88 covers a predetermined range of wavelengths and typically will include the wavelengths of a single channel of an optical network in which the OLT 80 is intended to be incorporated.

Figure 7:
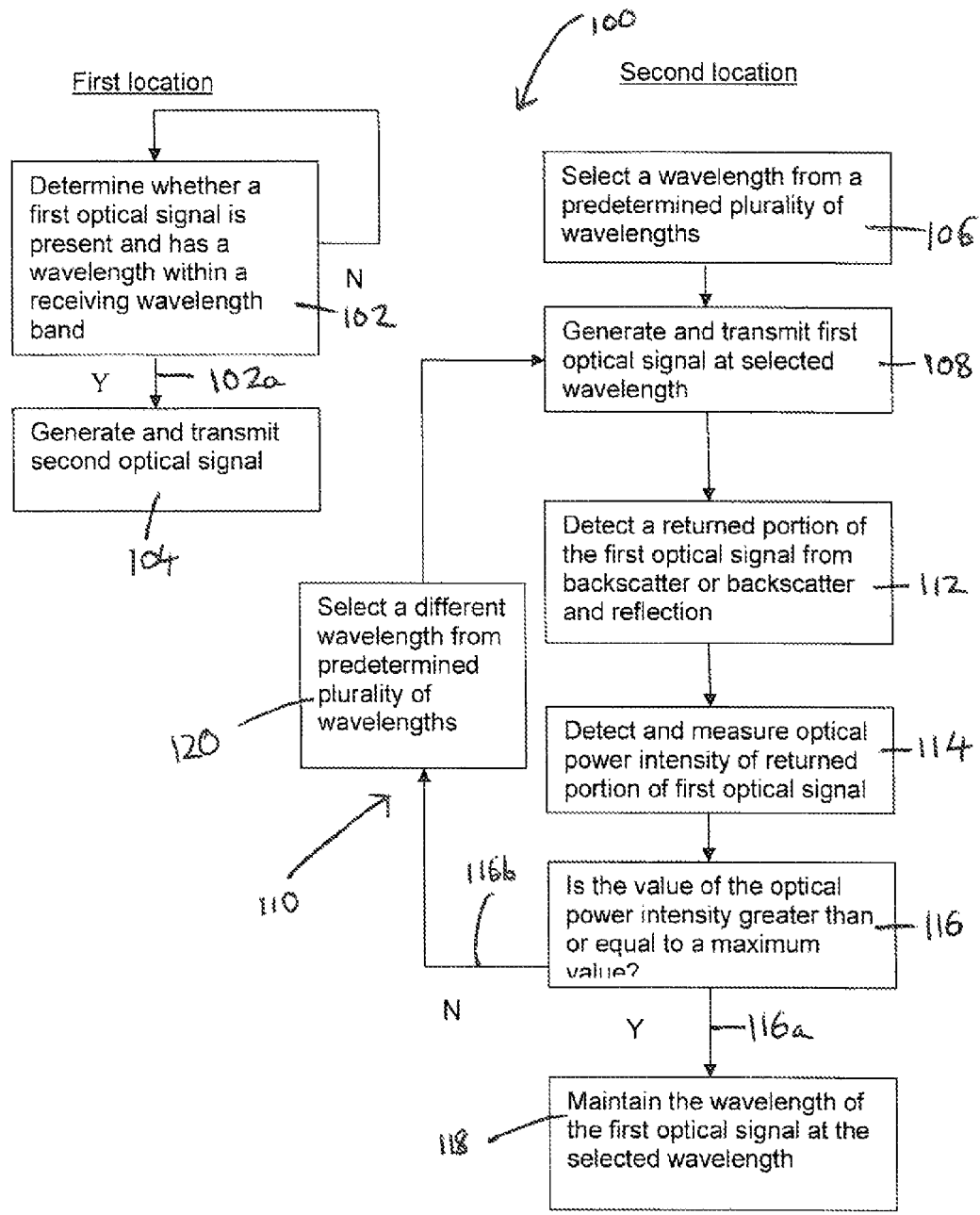
FIG. 7 is a flow chart of the steps of a method of setting a wavelength of an optical transmitter in an optical network according to a sixth embodiment of the invention.

A fifth embodiment of the invention provides a method 100 of configuring an optical transmitter in an optical network, as illustrated in the method steps of FIG. 7. The method 100 is suitable for use with any of the optical networks 1, 40, 50 described above.

The method comprises, at a first network location, determining whether a first optical signal is present and has a wavelength within a wavelength receiving band 102. If a first optical signal is present and has a wavelength within the receiving wavelength band 102, the method then comprises generating and transmitting a second optical signal 104.

The method further comprises, at a second network location, at which the optical transmitter to be configured is located, iteratively generating and transmitting the first optical signal at different wavelengths of a predetermined plurality of wavelengths until a sufficient backscatter portion of said first optical signal is returned to said first optical network element. In more detail, the method comprises determining whether sufficient backscatter portion returned optical signal is determined to be present, a predetermined criterion of a returned backscatter portion of said first optical signal can be selected and the detection of a characteristic of the predetermined criterion can be monitored for attainment of a threshold. The characteristic of the predetermined criterion is indicative of the optical power of the returned backscatter portion of said first optical signal. In more detail, the method comprises determining whether sufficient returned backscatter portion optical signal is present, and if the backscatter portion is not above or sufficiently above a threshold power value, selecting a wavelength from a predetermined plurality of wavelengths 108 and generating and transmitting a first optical signal at the selected wavelength 110. Following generation and transmission of the first optical signal, the method further comprises allowing a suitable time delay to elapse to allow transmission of the first optical signal and receipt of any resulting backscatter portion of the first optical signal, and determining whether the backscatter portion of the first optical signal returned to the first optical network element is sufficient and above the threshold value. If the returned portion is present and detected above a threshold level 114, 116, the method then comprises maintaining generation and transmission of the first optical signal at the selected wavelength 118. If the returned optical signal backscatter portion is not above a threshold value 116, 116b, the method comprises selecting a different wavelength from the predetermined plurality of wavelengths 120, and generating and transmitting the first optical signal at the next selected wavelength 110. Again, following elapse of the required delay the method then comprises determining whether a backscatter portion of said first optical signal returned to said first optical network element is present above a threshold value 112, 114, 116. The steps of determining whether a back scatter portion is present above a threshold or maximum value, 116, selecting a different wavelength 120 and generating and transmitting the first optical signal 108 are repeated until a returned backscatter portion of said first optical signal is determined to be present above a threshold or maximum value 116b.

Figure 8:
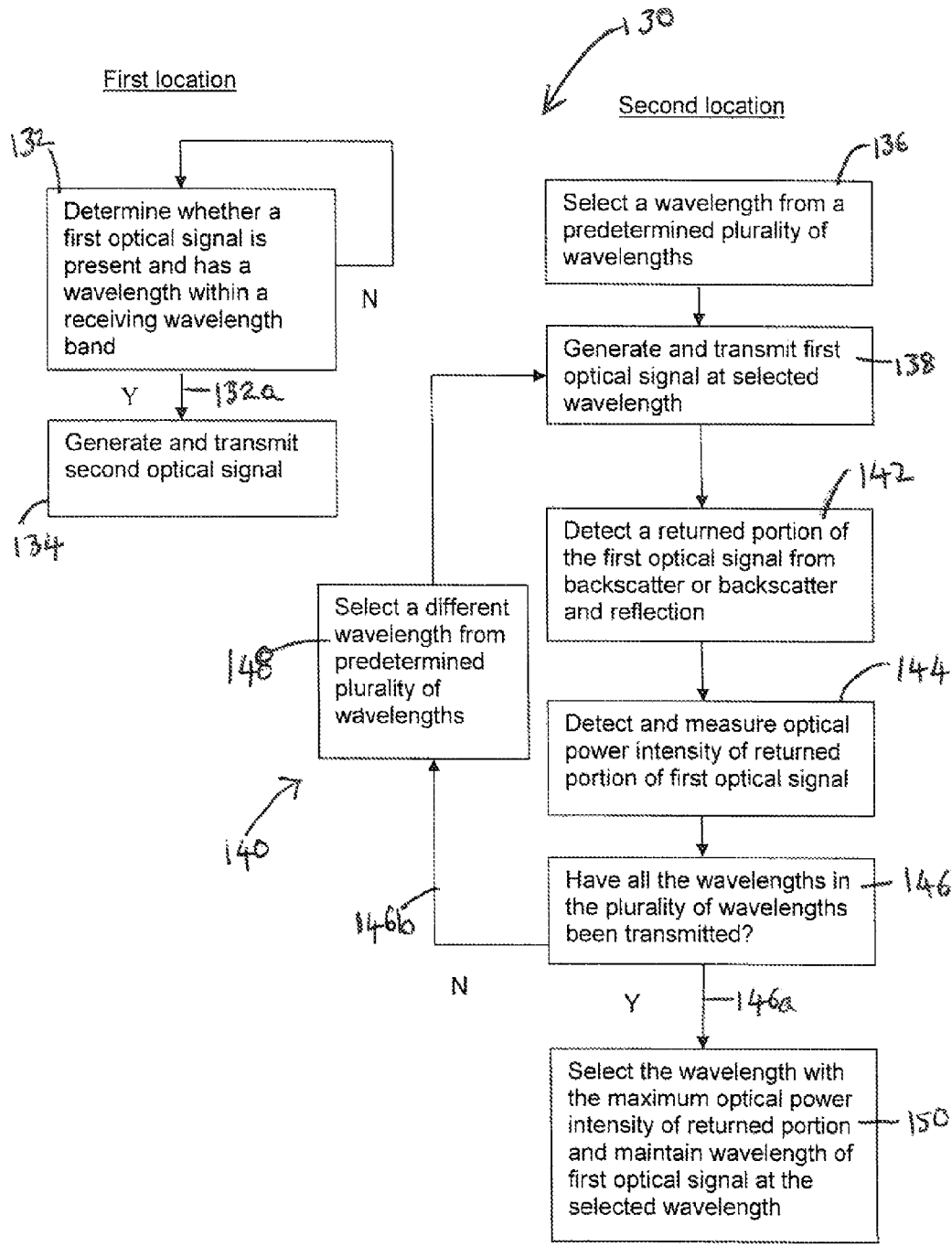
FIG. 8 is a flow chart of the steps of a method of setting a wavelength of an optical transmitter in an optical network according to a seventh embodiment of the invention.

Referring to FIG. 8, a sixth embodiment of the invention provides a method 130 of configuring a controller for an optical transmitter in an optical network. The method 130 is substantially the same as the method 100 of the previous embodiment, with the following modifications outlined. The reference numbers are retained for similar corresponding steps. The method 130 comprises steps 132, 132a, 134 corresponding to the method steps at a first location of method 100.

The method 130 comprises, at a first location, determining whether a first optical signal is present and has a wavelength within a receiving wavelength band 132. If a first optical signal is present and has a wavelength within the receiving wavelength band 132, the method then comprises generating and transmitting a second optical signal.

The method further comprises, at a second location, receiving a returned portion of the first optical signal from backscatter or backscatter and reflection 142 and detecting and measuring optical power intensity of the returned portion of said first optical signal 144. The method further comprises determining whether all the wavelengths in the predetermined plurality of the wavelengths have been transmitted 146. If so 146a, the method 130 comprises selecting the wavelength with the maximum optical power intensity of a backscatter portion of said first optical signal returned to said location. The method 130 further comprises maintaining generation and transmission of the first optical signal at the selected wavelength 150. If it is determined that not all of the wavelengths in the predetermined plurality of wavelengths have been transmitted 146, then method 130 comprises iteratively generating and transmitting the first optical signal at different wavelengths of the predetermined plurality of wavelengths until the plurality of wavelengths have been transmitted 148.

In more detail, the method 130 comprises selecting a first wavelength from the predetermined plurality of wavelengths 108 and generating and transmitting the first optical signal at the selected wavelength 110. The method 130 further comprises receiving a backscatter portion of said first optical signal and determining the optical power intensity 144. The method further comprises determining whether all the wavelengths in the predetermined plurality of the wavelengths have been transmitted 146. If so 146a, the method 130 comprises selecting the wavelength with the maximum optical power intensity of a backscatter portion of said first optical signal returned to said location. If it is determined that not all of the wavelengths in the predetermined plurality of wavelengths have been transmitted 146 the method comprises selecting a different wavelength from the predetermined plurality of wavelengths 148, and generating and transmitting the first optical signal at the new selected wavelength 138. A further returned portion of said first optical signal is then detected and optical power intensity of said returned portion of said first optical signal is measured at the new selected wavelength 138. The steps of selecting a different wavelength 148, generating and transmitting a first optical signal 138, receiving and detecting a returned portion of the first optical signal from backscatter or backscatter and reflection and measuring optical power intensity of said returned portion of the first optical signal 144 are repeated until all the wavelengths in the plurality of wavelengths have been transmitted.

Figure 9:
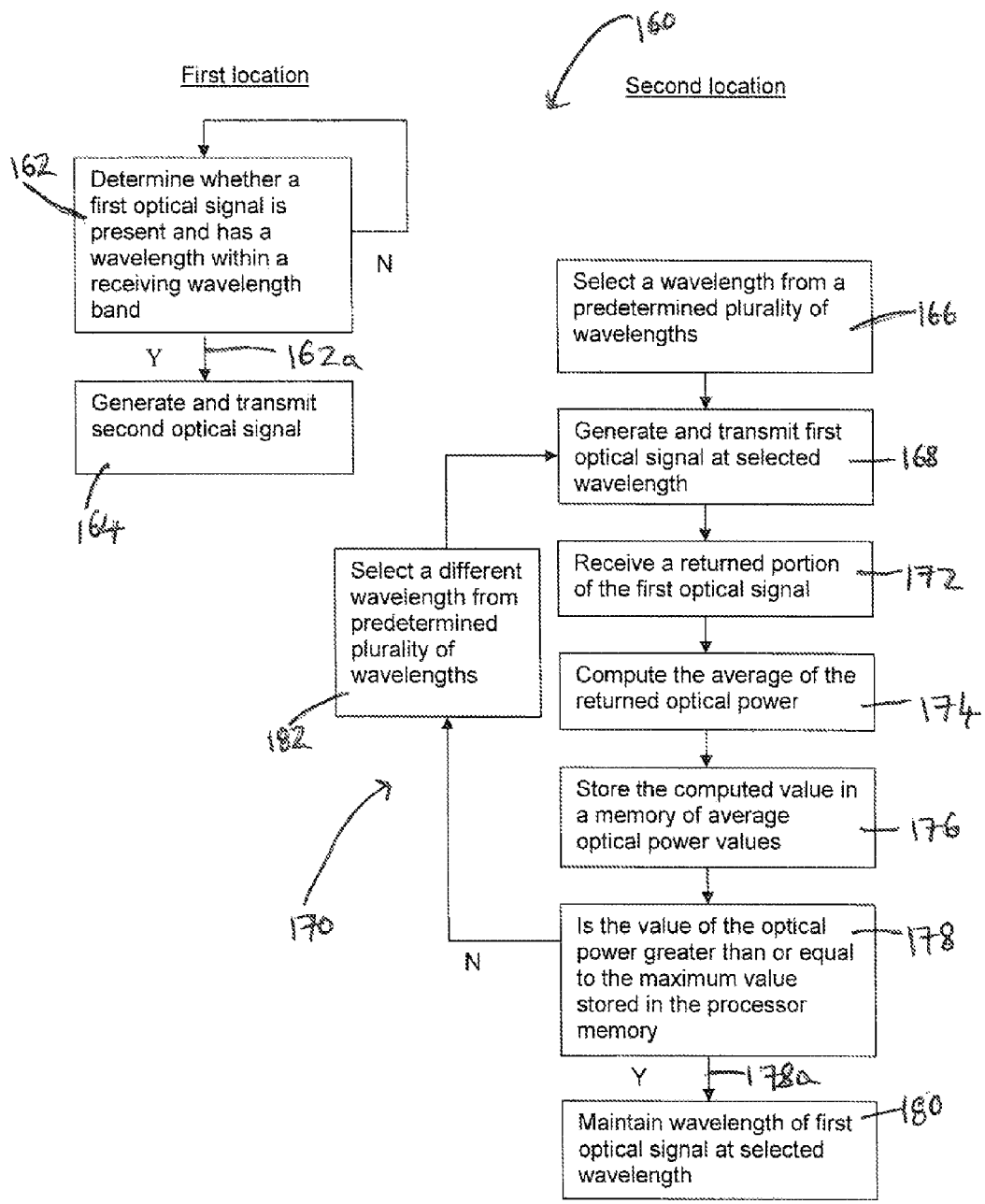
FIG. 9 is a flow chart of the steps of a method of setting a wavelength of an optical transmitter in an optical network according to a eighth embodiment of the invention.

FIG. 9 shows the steps of a method 160 of configuring an optical transmitter in an optical network according to a seventh embodiment of the invention. The steps of the method 160 are the same as the steps of the method 130 with some modification.

The method 160 comprises steps 162, 162a, 164 corresponding to the method steps at a first location of method 130.

The method 160 further comprises generating and transmitting a first optical signal and computing the average of the returned optical power of the backscatter portion of the first optical signal 172, 174. The method 160 further comprises storing the computed value in a memory of average optical power values 176 and determining whether the value of the optical power is greater than or equal to a maximum value stored in a processor memory or a threshold value 178. If the value of the optical power is greater than a threshold value or registers as a maximum value, the method 160 comprises maintaining generation and transmission of the first optical signal at the selected wavelength 180. If the average optical power value is below a maximum or a threshold 178, the method 160 comprises selecting a different wavelength from the predetermined plurality of wavelengths 182 and generating and transmitting the first optical signal at the new selected wavelength 168. A further backscatter portion of said first optical signal is generated and received, as described above. The steps of selecting a different wavelength 182, generating and transmitting a first optical signal 168, receiving a backscatter portion of said first optical receiver returned to said first optical network element 172 and determining whether the returned portion is of a sufficient average optical power is repeated until the correct wavelength, having a backscatter portion of a sufficient average optical power is received.

By the methods outlined in the examples above a portion of the upstream power is reflected back by the transmission path 30 and by the optical transmission medium (fibre) itself. The scattering and reflection is due partly to Rayleigh back scattering and partly due to reflection from one or more connectors in the optical network. The optical power emitted by other optical network elements is negligible with respect to that from the transmission path and ONT itself, due to the isolation of the AWG at the first optical network element (also known as the remote node in the network). In the examples described previously at each selected wavelength a signal sequence of a sequence of short pulses is transmitted as an optical signal. The pulses may be optical 'bits' representative of "1s" and "0s". The "1" bits may be separated by a fixed number of "zero" bits. The sequence of short pulses may be a predetermined, known sequence and is used to assess the quality and intensity of the backscatter portion of the first optical signal returned to the first optical network element.

The length of the sequence of short pulses fixes the level of back scattered power that it is possible to monitor with accurate sensitivity.

The transmission time and arrangement of the sequence of short pulses as a first optical signal can be stored in a memory or table format for assessment and comparison with other sequences sent at different ones of the predetermined plurality of wavelengths.

In the present examples the pulses can be transmitted at a bit rate of ≥1.25 Gb/s and transmitted power ≥0 dBm, for optical link lengths of less than or around 100 km.

The technique and method outlined above enables the first optical network element (ONT) to be completely independent of the rest of the link and the second optical network element. It provides for the setting of the frequency on wavelength of the link without it being necessary that the OLT is present. Thus the OLT and ONT may be provided by different vendors and may apply different standards of proprietary solutions.

Figure 10:
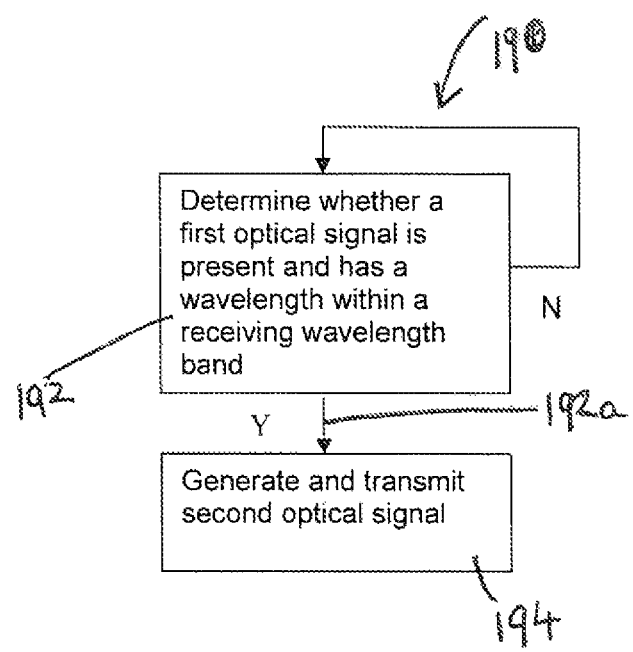
FIG. 10 is a flow chart of the steps of a method of remotely setting a wavelength of an optical transmitter in an optical network according to an ninth embodiment of the invention.

FIG. 10 shows the steps of a method 190 of configuring an optical transmitter in an optical network according to an eighth embodiment of the invention. Steps of the method 190 are similar to the steps of the method 130 and 160 at a first location and reference numbers 192, 198 and 194 correspond to 132, 132a and 134 in method 130 and steps 162, 162a and 164 in method 160. The method 190 is specifically for configuring an optical transmitter at an optical network terminal (ONT) in an optical network comprising an optical line terminal (OLT).

The invention claimed is:

1. An optical network comprising:
a first optical network element, a second optical network element, a transmission path between said first optical network element and said second optical network element, said first optical network element comprising a first optical transmitter arranged to generate and transmit a first optical signal, a first controller arranged to control said first optical transmitter to generate and transmit said first optical signal at a wavelength selected from a predetermined plurality of wavelengths, a first optical receiver apparatus arranged to detect a backscatter portion of said first optical signal returned to said first optical network element along said transmission path by scattering, and a second optical receiver apparatus arranged, to detect a second optical signal;
said second optical network element comprising a second optical transmitter arranged to generate and transmit said second optical signal, a second controller arranged to control said second optical transmitter to generate and transmit said second optical signal, and third optical receiver apparatus arranged to detect an optical signal having a wavelength within a receiving wavelength band,
said first optical receiver apparatus being arranged to detect a predetermined criterion of said returned backscatter portion of said first optical signal at said selected wavelength and to detect a characteristic of said predetermined criterion said characteristic indicative of the backscatter optical power of said returned backscatter portion of said first optical signal at said selected wavelength and said first optical receiver apparatus being arranged to compare said characteristic with a threshold value,
said first controller being arranged to iteratively generate and transmit said first optical signal at different wavelengths of said predetermined plurality of wavelengths, said first controller being arranged to identify a wavelength for which said characteristic is above said threshold value and being further arranged to control said first optical transmitter to subsequently maintain generation and transmission of said first optical signal at said wavelength, and
said third optical receiver apparatus being arranged to detect said first optical signal having said wavelength within a receiving band.

2. An optical network as claimed in claim 1, wherein said first controller comprises a memory, said first controller being arranged to iteratively store in said memory said characteristic indicative of the backscatter optical power at each one of said different wavelengths and said first controller being arranged to identify from said memory said wavelength for which said characteristic is the maximum stored value in said memory.

3. An optical network as claimed in claim 1 wherein said characteristic is the measured optical signal power of said returned backscatter portion.

4. An optical network as claimed in claim 1 wherein said transmission path comprises a wavelength selective router having a first port coupled to an output of said first optical network element, said wavelength selective router being provided with a pass wavelength band aligned with a transmission wavelength band, and arranged such that said backscatter optical power is returned to said first optical receiver when a wavelength of said first transmitter is tuned to said pass band.

5. An optical network as claimed in claim 4, wherein said wavelength selective router comprises a plurality of second ports, each connected to a said first port, wherein each one of said plurality of second ports has a separate pass wavelength band.

6. An optical network comprising:
a first optical network element connected to a transmission path arranged to carry a first optical signal, said first optical network element comprising a first optical transmitter arranged to generate and transmit said first optical signal, a first controller arranged to control said first optical transmitter to generate and transmit said first optical signal at a wavelength selected from a predetermined plurality of wavelengths, a first optical receiver apparatus arranged to detect a backscatter portion of said first optical signal returned to said first optical network element along said transmission path by scattering, a second optical receiver apparatus arranged to detect a second optical signal;
said first optical receiver apparatus being arranged to detect a predetermined criterion of said returned backscatter portion of said first optical signal at said selected wavelength and to detect a characteristic of said predetermined criterion said characteristic indicative of the backscatter optical power of said returned backscatter portion of said first optical signal at said selected wavelength and said first optical receiver apparatus being arranged to compare said characteristic with a threshold value, and said first controller being arranged to iteratively generate and transmit said first optical signal at different wavelengths of said predetermined plurality of wavelengths, said first controller being arranged to identify a wavelength for which said characteristic is above said threshold value and being further arranged to control said first optical transmitter to subsequently maintain generation and transmission of said first optical signal at said wavelength.

7. An optical network as claimed in claim 1, wherein said first optical signal comprises a predetermined signal sequence and said characteristic of said predetermined criterion of said backscatter portion is the average optical power over said sequence.

8. An optical network as claimed in claim 1, wherein said first controller further comprises a digital signal processor apparatus being arranged to store and analyse said characteristic indicative of the backscatter optical power.

9. An optical network as claimed in claim 1, wherein a connection between one or more components in said transmission path of said optical network has an insertion loss such that a reflectance value from said component and connection is in the range from 50dB to 60dB.

10. An optical network as claimed in claim 9, wherein said connection is a coupling formed by an angle polished connector.

11. An optical network as claimed in claim 1, wherein said optical network comprises a plurality of said first optical network elements, a corresponding plurality of first optical transmitters and a corresponding plurality of first optical receiver apparatus and second optical receiver apparatus each arranged to detect an optical signal having a wavelength within a different receiving wavelength band, said optical receiver apparatus being coupled to said respective output ports of an arrayed waveguide grating.

12. An optical network as claimed in claim 1, wherein the transmission path comprises a transmission medium, preferably an optical fibre element.

13. An optical network element comprising:

an optical transmitter arranged to generate and transmit a first optical signal; a controller arranged to control said optical transmitter to generate and transmit said first optical signal at a wavelength selected from a predetermined plurality of wavelengths, a first optical receiver apparatus arranged to detect a backscatter portion of said first optical signal returned to said optical network element by scattering; and a second optical receiver apparatus arranged to detect a second optical signal;

said optical network element being arranged to detect a predetermined criterion of said returned backscatter portion of said first optical signal at said selected wavelength and to detect a characteristic of said predetermined criterion said characteristic indicative of the backscatter optical power of said returned backscatter portion and said optical receiver apparatus being arranged to compare said characteristic with a threshold value, said controller being arranged to iteratively generate and transmit said first optical signal at different wavelengths of said predetermined plurality of wavelengths, said controller being arranged to identify a wavelength for which said characteristic is above said threshold value and being further arranged to control said optical transmitter to subsequently maintain generation and transmission of said first optical signal at said wavelength.

14. A method of configuring an optical transmitter in an optical network, the method comprising:
 a. generating and transmitting a first optical signal at a wavelength selected from a predetermined plurality of wavelengths;
 b. receiving a returned backscatter portion of said first optical signal at an optical receiver apparatus arranged to detect an optical signal having a wavelength within a receiving wavelength band;
 c. detecting a predetermined criterion of said returned backscatter portion of said first optical signal at said selected wavelength and detecting a characteristic of said predetermined criterion said characteristic indicative of the backscatter optical power of said returned backscatter portion at said optical receiver apparatus arranged to detect said characteristic;
 d. comparing said characteristic with a threshold value at said optical receiver apparatus;
 e. iteratively generating and transmitting said first optical signal at different wavelengths of said predetermined plurality of wavelengths;
 f. identifying a wavelength for which said characteristic is above said threshold value and subsequently maintaining generation and transmission of said first optical signal at said wavelength.

15. A method of configuring a controller for an optical transmitter in an optical network, the method comprising issuing instructions directed to:
 a. generating and transmitting a first optical signal at a wavelength selected from a predetermined plurality of wavelengths;
 b. receiving a returned backscatter portion of said first optical signal at an optical receiver apparatus arranged to detect an optical signal having a wavelength within a receiving wavelength band;
 c. detecting a predetermined criterion of said returned backscatter portion of said first optical signal at said selected wavelength and detecting a characteristic of said predetermined criterion said characteristic indicative of the backscatter optical power of said returned backscatter portion at said optical receiver apparatus arranged to detect said characteristic;
 d. comparing said characteristic with a threshold value at said optical receiver apparatus;
 e. iteratively generating arid transmitting said first optical signal at different wavelengths of said predetermined plurality of wavelengths;
 f. identifying a wavelength for which said characteristic is above said threshold value and subsequently maintaining generation and transmission of said first optical signal at said wavelength.

16. A computer program product embodied in a non-transitory computer readable medium comprising steps configured to execute the method of claim 14.

* * * * *